(12) United States Patent
Sato

(10) Patent No.: US 8,830,604 B2
(45) Date of Patent: Sep. 9, 2014

(54) OPTICAL ELEMENT DRIVING APPARATUS AND OPTICAL APPARATUS

(71) Applicant: Canon Kabushiki Kaisha, Tokyo (JP)

(72) Inventor: Katsuhiko Sato, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 4 days.

(21) Appl. No.: 13/669,567

(22) Filed: Nov. 6, 2012

(65) Prior Publication Data

US 2013/0120860 A1    May 16, 2013

(30) Foreign Application Priority Data

Nov. 10, 2011    (JP) .................................. 2011-246836

(51) Int. Cl.
   *G02B 7/02*    (2006.01)
   *G02B 7/10*    (2006.01)

(52) U.S. Cl.
   CPC ..................................... *G02B 7/102* (2013.01)
   USPC ....................................................... 359/824

(58) Field of Classification Search
   USPC ....................................................... 359/824
   See application file for complete search history.

(56) References Cited

U.S. PATENT DOCUMENTS

2008/0144198 A1*   6/2008   Sato .............................. 359/824
2011/0063742 A1*   3/2011   Mori ............................. 359/823

FOREIGN PATENT DOCUMENTS

| JP | 2000-241694 A | 9/2000 |
| JP | 2011-075674 A | 4/2011 |

* cited by examiner

*Primary Examiner* — James Jones
(74) *Attorney, Agent, or Firm* — Rossi, Kimms & McDowell LLP

(57) ABSTRACT

The optical element driving apparatus includes a voice coil motor moving an optical element in a first direction, and a magnetic sensor detecting a position of the optical element. A yoke of the motor includes a first yoke portion having a magnet attaching surface to which the magnet is attached and a second yoke portion disposed away from the first yoke portion in a second direction so as to form a space with magnet, allowing movement of a coil of the motor in the first direction. The second yoke portion is disposed closer to the magnetic sensor than the first yoke portion in a plane orthogonal to the first direction. In a third direction orthogonal to the first and second directions, a magnetic path width A of the second yoke portion and a width C of the magnet have the following relationship of A>C.

5 Claims, 7 Drawing Sheets

OPTICAL ELEMENT DRIVING APPARATUS AND OPTICAL APPARATUS

BACKGROUND OF THE INVENTION

1. Field of the Invention

The present invention relates to an optical element driving apparatus operable to move an optical element such as a lens, and particularly to an optical element driving apparatus using a voice coil motor as a driving source and a magnetic sensor for detecting a position of the optical element.

2. Description of the Related Art

Optical element driving apparatuses are provided in lens barrels of optical apparatuses such as video cameras and digital still cameras to move a lens in an optical axis direction for zooming or focusing, or to move a lens in a direction orthogonal to the optical axis direction for reducing image blur caused by hand jiggling.

In such optical element driving apparatuses, disposing a magnetic sensor as a position detector close to a voice coil motor as a driving source causes output of the magnetic sensor to be influenced by magnetism (magnetic flux) leaking from the voice coil motor, which deteriorates position detection accuracy of the optical element.

A voice coil motor used in an optical element driving apparatus disclosed in Japanese Patent Laid-Open No. 2011-75674 includes a first yoke extending in an optical axis direction and a second yoke disposed orthogonally to the optical axis direction. The voice coil motor has, in order to suppress magnetic flux leakage, a smaller thickness of the second yoke than that of the first yoke and a wider width of the second yoke than that of the first yoke to make cross-sectional areas (thickness×width) of the first and second yokes equal to each other.

Moreover, a voice coil motor used in an optical element driving apparatus disclosed in Japanese Patent Laid-Open No. 2000-241694 includes a yoke provided with a protrusion or a through hole formed at a position shifted from a center of a magnet attached to the yoke. The protrusion or the through hole formed at the position shifted from the center of the magnet shifts a magnetic center, which reduces influence of magnetic flux leakage on a magnetic sensor.

The voice coil motor disclosed in Japanese Patent Laid-Open No. 2011-75674 can suppress magnetic flux leakage from a joint portion of the first yoke with the second yoke, which is an end portion in the optical axis direction of the first yoke, but cannot sufficiently suppress magnetic flux leakage from a lateral opening of the first yoke.

On the other hand, the protrusion or the through hole formed in the yoke of the voice coil motor disclosed in Japanese Patent Laid-Open No. 2000-241694 provides a small effect of suppressing the magnetic flux leakage, which makes it difficult to sufficiently reduce the influence of the magnetic flux leakage on the magnetic sensor.

SUMMARY OF THE INVENTION

The present invention provides an optical element driving apparatus capable of sufficiently reducing magnetic flux leakage from a voice coil motor to suppress influence of the magnetic flux leakage on a magnetic sensor.

The present invention provides as one aspect thereof an optical element driving apparatus including an optical element movable in a first direction, a voice coil motor constituted by a magnet, a yoke and a coil and configured to move the optical element by movement of the coil with respect to the magnet and the yoke in the first direction, and a magnetic sensor operable to detect a position of the optical element in the first direction. The yoke includes a first yoke portion extending in the first direction and having a magnet attaching surface to which the magnet is attached and a second yoke portion extending in the first direction and being disposed away from the first yoke portion in a second direction orthogonal to the first direction so as to form a space allowing movement of the coil in the first direction, with the magnet attracted to the magnet attaching surface. The second yoke portion is disposed closer to the magnetic sensor than the first yoke portion in a plane orthogonal to the first direction. In a third direction orthogonal to the first and second directions, a magnetic path width A of the second yoke portion and a width C of the magnet have the following relationship:

$A > C.$

The present invention provides as another aspect thereof an optical apparatus including a main body of the optical apparatus, and the above-described optical element driving apparatus included in the main body.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

[Embodiment 1]

Figure 1:
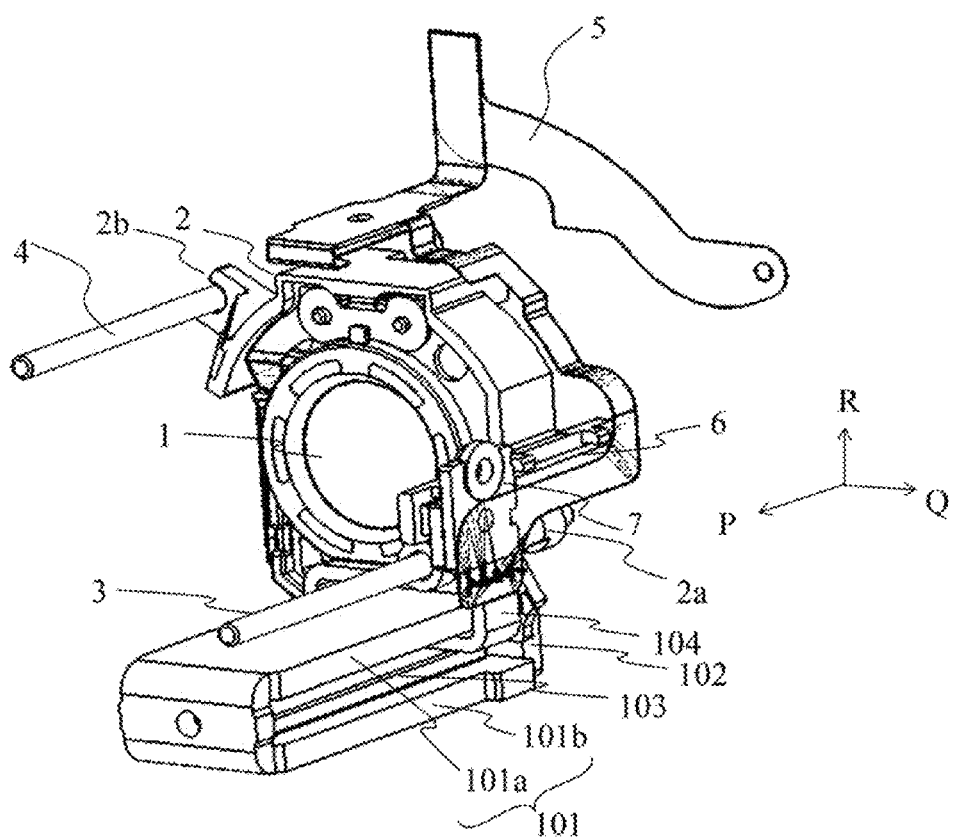
FIG. 1 is a perspective view showing a configuration of a lens driving apparatus that is Embodiment 1 of the present invention.
Figure 2:
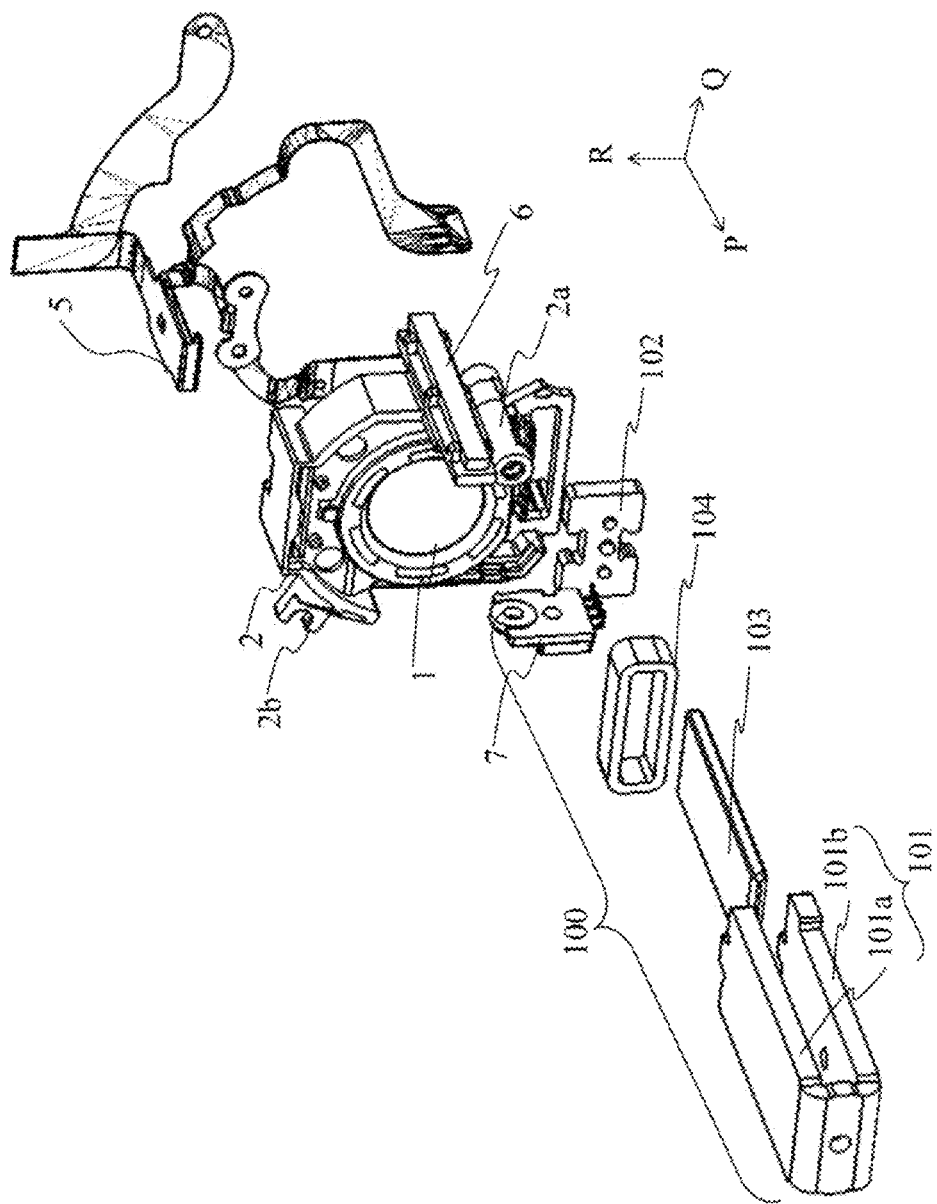
FIG. 2 is an exploded perspective view showing the configuration of the lens driving apparatus of Embodiment 1.
Figure 3B:
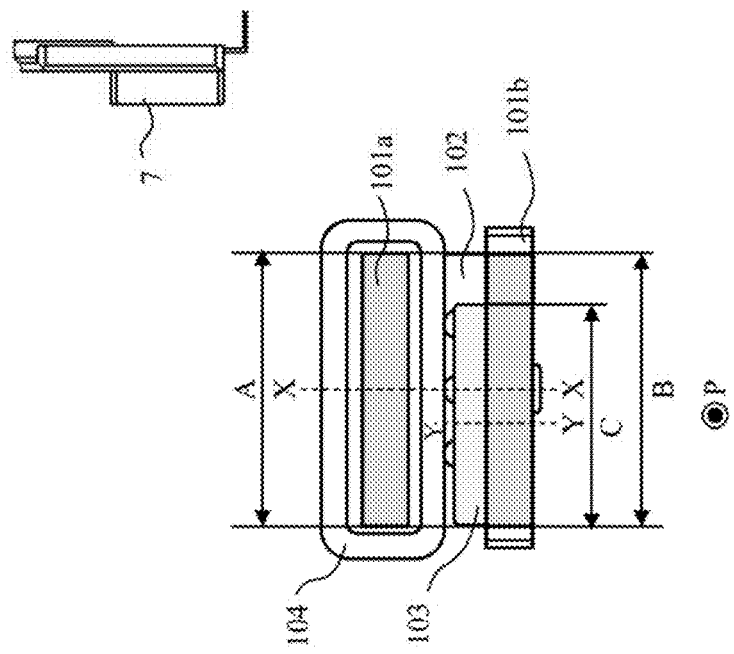
FIGS. 3A and 3B are cross-sectional views of a voice coil motor in the lens driving apparatus of Embodiment 1.
Figure 3A:
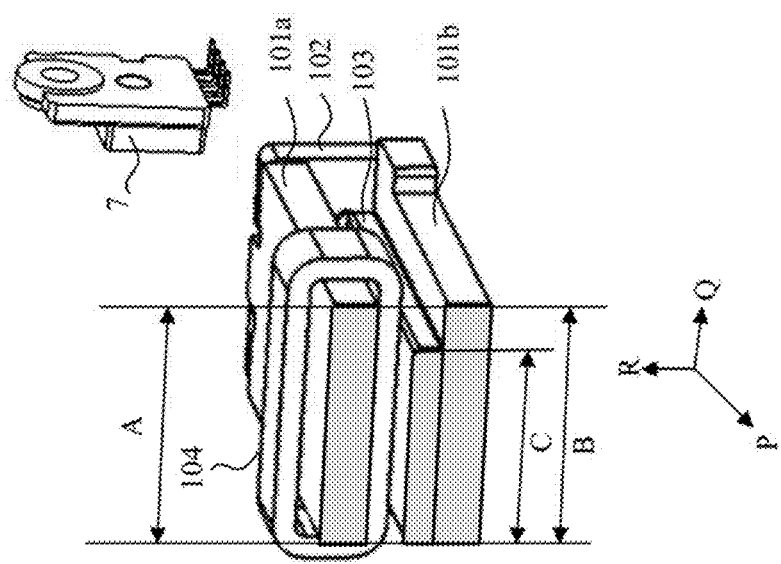

FIGS. 1 and 2 show a configuration of a lens driving apparatus (optical element driving apparatus) that is a first embodiment (Embodiment 1) of the present invention. FIGS. 3A and 3B show cross-sections of a magnetic circuit of the lens driving apparatus.

The lens driving apparatus of this embodiment is provided in a lens barrel of an image pickup apparatus (optical apparatus) such as a video camera and a digital still camera. The lens driving apparatus may be provided in an interchangeable lens (optical apparatus) detachably attachable to a lens-interchangeable image pickup apparatus.

The lens driving apparatus includes a lens holding frame 2 that holds a lens as an optical element and is movable in an optical axis direction (first direction) P, and a voice coil motor 100 that moves the lens holding frame 2 in the optical axis direction P. The lens and the lens holding frame 2 can be collectively treated as an optical element.

The lens holding frame 2 has a sleeve portion 2a and a rotation preventing portion 2b that respectively engage with guide bars 3 and 4, whose both ends are supported by a fixed barrel (not shown) and an image sensor holding plate (not shown), movably in the optical axis direction P. The image sensor holding plate holds an image sensor (not shown) such as a CCD sensor or a CMOS sensor and an optical filter such as an infrared-cutting filter or a low-pass filter, and is joined with the fixed barrel to constitute a chassis (main body) of the lens barrel.

The voice coil motor 100 includes a main yoke 101 extending in the optical axis direction P and has a U-shape when viewed from a width direction (third direction) Q orthogonal to the optical axis direction P. The main yoke 101 is fixed to the above-mentioned fixed barrel or image sensor holding plate.

The main yoke 101 includes a first yoke portion 101b that extends in the optical axis direction P and has a magnet attaching surface, and a second yoke portion 101a that extends in the optical axis direction P and is disposed away from the first yoke portion 101b in a thickness direction (second direction) R orthogonal to the optical axis and width directions P and Q. In FIGS. 1 to 3A and 3B, the first yoke portion 101b is disposed on an upper side and the second yoke 101a is disposed on a lower side. In the following description, upper and lower sides of the main yoke 101 and other members correspond to the upper and lower sides in FIGS. 1 to 3A and 3B.

A permanent magnet (hereinafter simply referred to as "a magnet") 103 having a flat plate shape and formed so as to extend in the optical axis direction P is attached to the magnet attaching surface that is an inner surface (upper surface) of the first yoke 101b. The magnet 103 has an N-pole and an S-pole that are formed in the thickness direction R. The second yoke portion 101a is disposed away from the first yoke portion 101b in the thickness direction R so as to form a space with the magnet 103 attached to the magnet attaching surface: the space allows movement of a lower portion of an air core coil (described later) 104 in the optical axis direction P.

A sub yoke 102 disposed orthogonally to the optical axis direction P is attached to a rear end of the main yoke 101 in the optical axis direction P so as to close a rear end opening between the first and second yoke portions 101b and 101a. The sub yoke 102 has an H-shape when viewed from the optical axis direction P.

The air core coil (hereinafter simply referred to as "a coil") 104 has a rectangular ring shape when viewed from the optical axis direction P. A portion corresponding to a lower side of the rectangular ring is disposed as the above-mentioned lower portion movably in the optical axis direction P between the second yoke portion 101a of the main yoke 101 and the magnet 103 (that is, the first yoke portion 101b). A central axis of the coil 104 extends in the optical axis direction P. The coil 104 is fixed to the lens holding frame 2. A flexible substrate 5 is connected to the coil 104.

Energization of the coil 104 through the flexible substrate 5 generates a thrust force (Lorentz force) acting on the coil 104 in the optical axis direction P by an electromagnetic action between the magnet 103 and the coil 104. The thrust force moves the lens holding frame 2 in the optical axis direction P.

Moreover, an encoder magnet (magnetic scale) 6 extending in the optical axis direction P is attached to the lens holding frame 2. An MR sensor 7 as a magnetic sensor is held by the fixed barrel or the image sensor holding plate at a position facing the encoder magnet 6. Movement of the encoder magnet 6 with the lens holding frame 2 in the optical axis direction P with respect to the MR sensor 7 causes the MR sensor 7 to output a signal that changes with change in magnetism from the encoder magnet 6. Using the signal output from the MR sensor 7 enables detection of a position of the lens holding frame 2 (that is, a position of the lens).

Then, energization of the coil 104 is controlled such that the position of the lens holding frame 2 detected by using the encoder magnet 6 and the MR sensor 7 approaches a control target position.

The magnet 103, the main yoke 101, the sub yoke 102 and the coil 104 constitute a magnetic circuit. This magnetic circuit includes openings (hereinafter referred to as "lateral openings of the magnetic circuit") formed on both sides in the width direction Q between the first and second yoke portions 101b and 101a of the main yoke 101, which causes leakage of magnetic fluxes (magnetic flux leakage) from the lateral openings of the magnetic circuit. Moreover, disposing the MR sensor 7 near at least one of the lateral openings of the magnetic circuit causes a problem such as decrease or distortion of the output from the MR sensor 7 due to influence of the leaked magnetic flux, as compared with a case where the MR sensor 7 is not influenced by the leaked magnetic flux. The decreased output from the MR sensor 7 is easy to be influenced by noise, which may make it impossible to accurately detect and control the position of the lens holding frame 2.

Thus, this embodiment provides, to the voice coil motor 100 (including the main yoke 101 and the magnet 103) and the MR sensor 7, a positional relationship shown in FIGS. 3A and 3B. FIGS. 3A and 3B show cross-sections of the voice coil motor 100 cut along a plane (QR plane) orthogonal to the optical axis direction P, and also show the positional relationship between the voice coil motor 100 and the MR sensor 7.

In this embodiment, as shown in FIGS. 3A and 3B, in the QR plane, the second yoke portion 101a of the main yoke 101 is disposed closer to the MR sensor 7 than the first yoke portion 101b of the main yoke 101. In other words, the magnet 103 is attached to the magnet attaching surface of the first yoke portions 101b located farther from the MR sensor 7 than the second yoke portion 101a.

Moreover, in this embodiment, in the width direction Q, a magnetic path width A of the second yoke portion 101a, a magnetic path width B of the first yoke portion 101b and a width C of the magnet 103 have the following relationship:

A>C, and

A=B (that is, B>C).

The magnetic path width in this embodiment means a length in the width direction Q of an effective part of each of the first and second yoke portions 101b and 101a as a magnetic path through which a magnetic flux generated from the magnet 103 passes: the effective part as the magnetic path (effective magnetic path part) can be also said as an effective part as the magnetic circuit. In a case where the first yoke portion 101b or the second yoke portion 101a includes a non-magnetic path part not serving as a magnetic path, but being only formed as a portion held by another member or used for positioning of the main yoke 101, the non-magnetic path part is not included in the effective magnetic path part.

The term "magnetic path" means a path as a set of straight lines (whole straight lines) connecting two yokes facing each other. Accordingly, the term "magnetic path width" means a width at a certain cross section of a path formed by connecting widths (maximum widths) of the two yokes. On the other hand, the term "magnetic path width of the yoke (yoke portion)" means a width of the yoke itself (that is, of a portion serving as a path through which magnetic fluxes pass).

Furthermore, in this embodiment, as shown in FIG. 3B, in the width direction Q, a center Y of the magnet 103 is shifted to a side away from the MR sensor 7 with respect to a center X of the second yoke portion 101a.

Such a configuration enables reduction of the magnetic flux leakage from the lateral opening of the magnetic circuit toward the MR sensor 7, and thereby makes it possible to dispose the MR sensor 7 closer to the magnetic circuit (that is, to the voice coil motor 100), which is effective for miniaturization of the lens driving apparatus including the voice coil motor 100 and the MR sensor 7 (furthermore, miniaturization of the lens barrel and miniaturization of the optical apparatus).

Figure 6A:
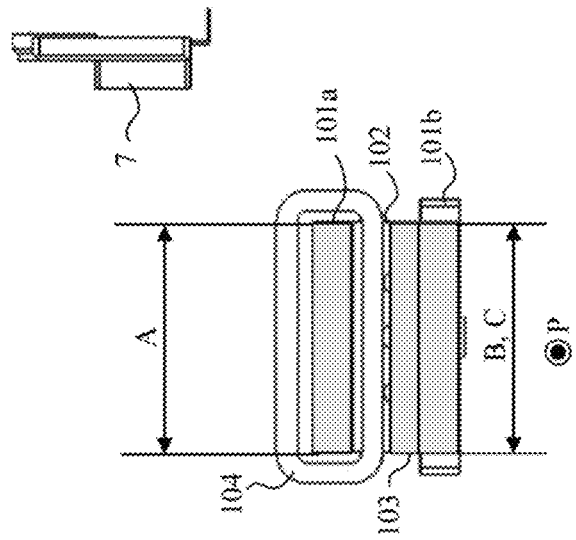
FIGS. 6A and 6B are cross-sectional views of a voice coil motor in a conventional lens driving apparatus.
Figure 6B:
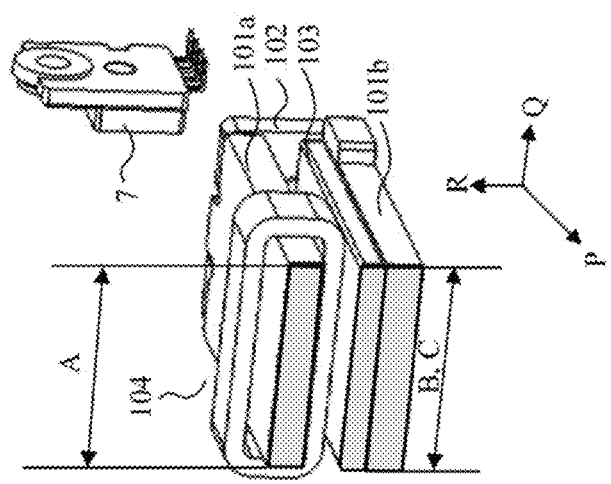

FIGS. 6A and 6B show, as a comparative example, a conventional lens driving apparatus having an illustrated positional relationship between a voice coil motor (including a main yoke (101a, 101b), a sub yoke 102, a magnet 103 and a coil 104) and an MR sensor 7. FIGS. 6A and 6B show cross-sections of the voice coil motor cut along a QR plane orthogonal to an optical axis direction P, and also show a positional relationship between the voice coil motor and the MR sensor 7.

Also in this comparative example, as shown in FIGS. 6A and 6B, in the QR plane, a second yoke portion 101a of the main yoke is disposed closer to the MR sensor 7 than the first yoke portion 101b of the main yoke.

However, in this comparative example, in a width direction Q, a magnetic path width A of the second yoke portion 101a, a magnetic path width B of the first yoke portion 101b and a width C of the magnet 103 have the following relationship:

$$A=B=C.$$

That is, A and C do not have the relationship of A>C.

Moreover, in this comparative example, as shown in FIG. 6B, in the width direction Q, a center Y of the magnet 103 coincides with a center X of the second yoke portion 101a.

Such a conventional configuration causes output of the MR sensor 7 to be significantly influenced by the above-mentioned magnetic flux leaked from the lateral opening of the magnetic circuit, which causes the above-mentioned problem.

Although this embodiment described the case where B and C have the relationship of B>C, B and C may have a relationship of B=C as in Embodiments 2 and 3 described below. That is, B and C are required to have a relationship of B≥C.

Furthermore, the magnetic path width A of the second yoke portion 101a, the magnetic path width B of the first yoke portion 101b and the width C of the magnet 103 may have at least one of the following relationships:

$$(A+B)/2>C;$$

$$(A+B)/2\times0.9>C; \text{ and}$$

$$A\times0.9>C \text{ and } B\times0.9>C.$$

[Embodiment 2]

Figure 4B:
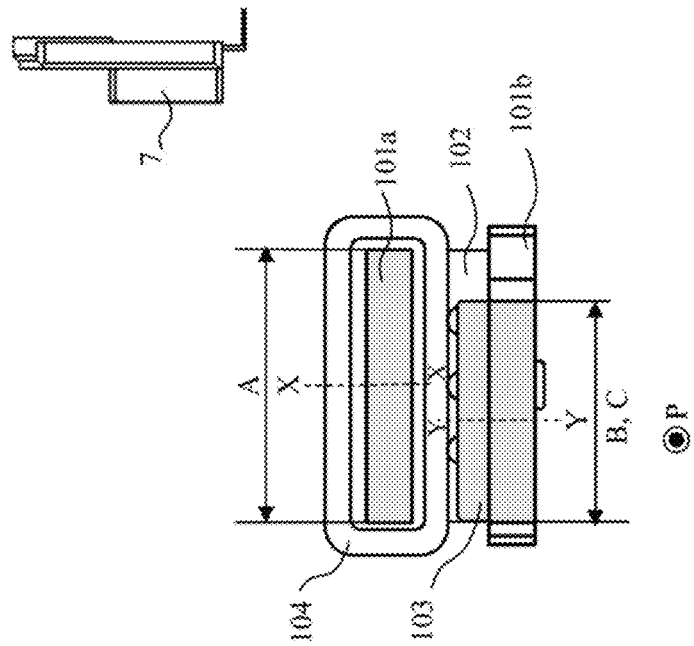
FIGS. 4A and 4B are cross-sectional views of a voice coil motor in a lens driving apparatus that is Embodiment 2 of the present invention.
Figure 4A:
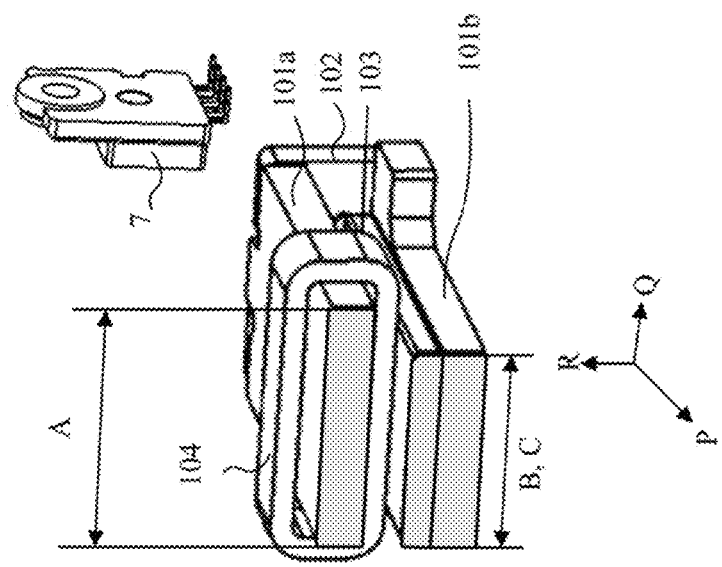

Next, description will be made of a lens driving apparatus that is a second embodiment (Embodiment 2) of the present invention. FIGS. 4A and 4B show cross-sections of a voice coil motor (including a main yoke (101a, 101b), a sub yoke 102, a magnet 103 and a coil 104) of the lens driving apparatus, cut along a QR plane orthogonal to an optical axis direction P, and also show a positional relationship between the voice coil motor and an MR sensor 7.

Also in this embodiment, as well as in Embodiment 1, in the QR plane, a second yoke portion 101a of the main yoke is disposed closer to the MR sensor 7 than a first yoke portion 101b of the main yoke 101.

Moreover, in this embodiment, in a width direction Q, a magnetic path width A of the second yoke portion 101a, a magnetic path width B of the first yoke portion 101b and a width C of the magnet 103 have the following relationship:

$$A>C$$

$$B=C.$$

Furthermore, also in this embodiment, as shown in FIG. 4B, in the width direction Q, a center Y of the magnet 103 is shifted to a side away from the MR sensor 7 with respect to a center X of the second yoke portion 101a.

Such a configuration enables, as well as in Embodiment 1, reduction of the above-mentioned magnetic flux leakage from the lateral opening of the magnetic circuit toward the MR sensor 7, and thereby makes it possible to dispose the MR sensor 7 closer to the magnetic circuit (that is, to the voice coil motor), which is effective for miniaturization of the lens driving apparatus including the voice coil motor and the MR sensor 7 (furthermore, miniaturization of a lens barrel including the lens driving apparatus and miniaturization of an optical apparatus including the lens barrel).

[Embodiment 3]

Figure 5A:
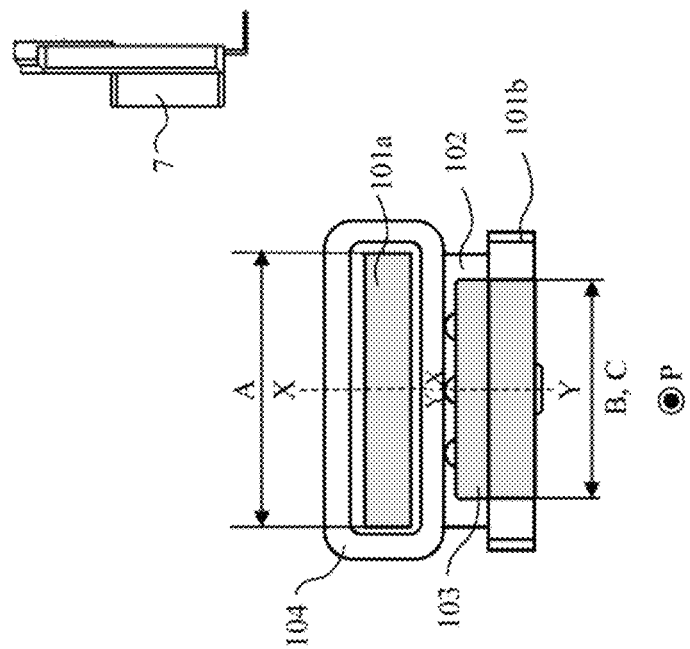
FIGS. 5A and 5B are cross-sectional views of a voice coil motor in a lens driving apparatus that is Embodiment 3 of the present invention.
Figure 5B:
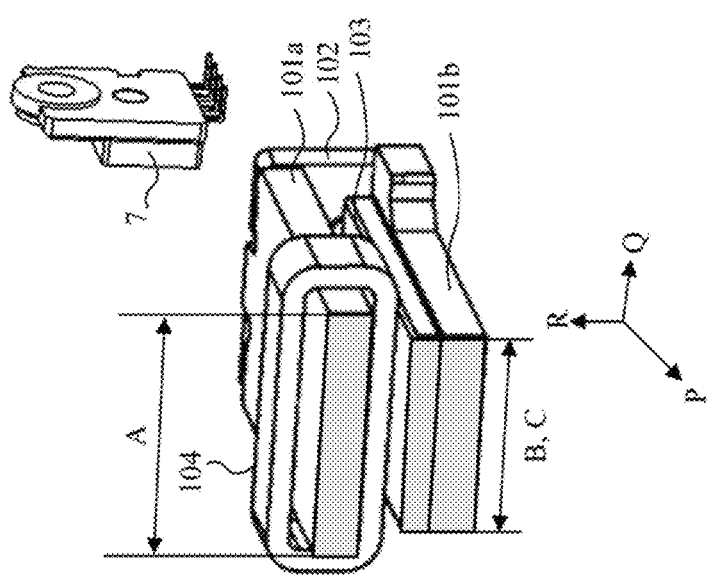

Next, description will be made of a lens driving apparatus that is a third embodiment (Embodiment 3) of the present invention. FIGS. 5A and 5B show cross-sections of a voice coil motor (including a main yoke (101b, 101a), a sub yoke 102, a magnet 103 and a coil 104) of the lens driving apparatus, cut along a QR plane orthogonal to an optical axis direction P, and also show a positional relationship between the voice coil motor and an MR sensor 7.

Also in this embodiment, as well as in Embodiment 1, in the QR plane, a second yoke portion 101a of the main yoke is disposed closer to the MR sensor 7 than a first yoke portion 101b of the main yoke.

Moreover, in this embodiment, as well as in Embodiment 2, in a width direction Q, a magnetic path width A of the second yoke portion 101a, a magnetic path width B of the first yoke portion 101b and a width C of the magnet 103 have the following relationship:

$$A>C$$

$$B=C.$$

However, in this embodiment, as shown in FIG. 5B, in the width direction Q, a center Y of the magnet 103 coincides with a center X of the second yoke portion 101a.

Such a configuration also enables, as well as in Embodiments 1 and 2, reduction of the above-mentioned magnetic flux leakage from the lateral opening of the magnetic circuit toward the MR sensor 7, and thereby makes it possible to dispose the MR sensor 7 closer to the magnetic circuit (that is, to the voice coil motor), which is effective for miniaturization of the lens driving apparatus including the voice coil motor and the MR sensor 7 (furthermore, miniaturization of a lens barrel including the lens driving apparatus and miniaturization of an optical apparatus including the lens barrel).

[Embodiment 4]

Figure 7:
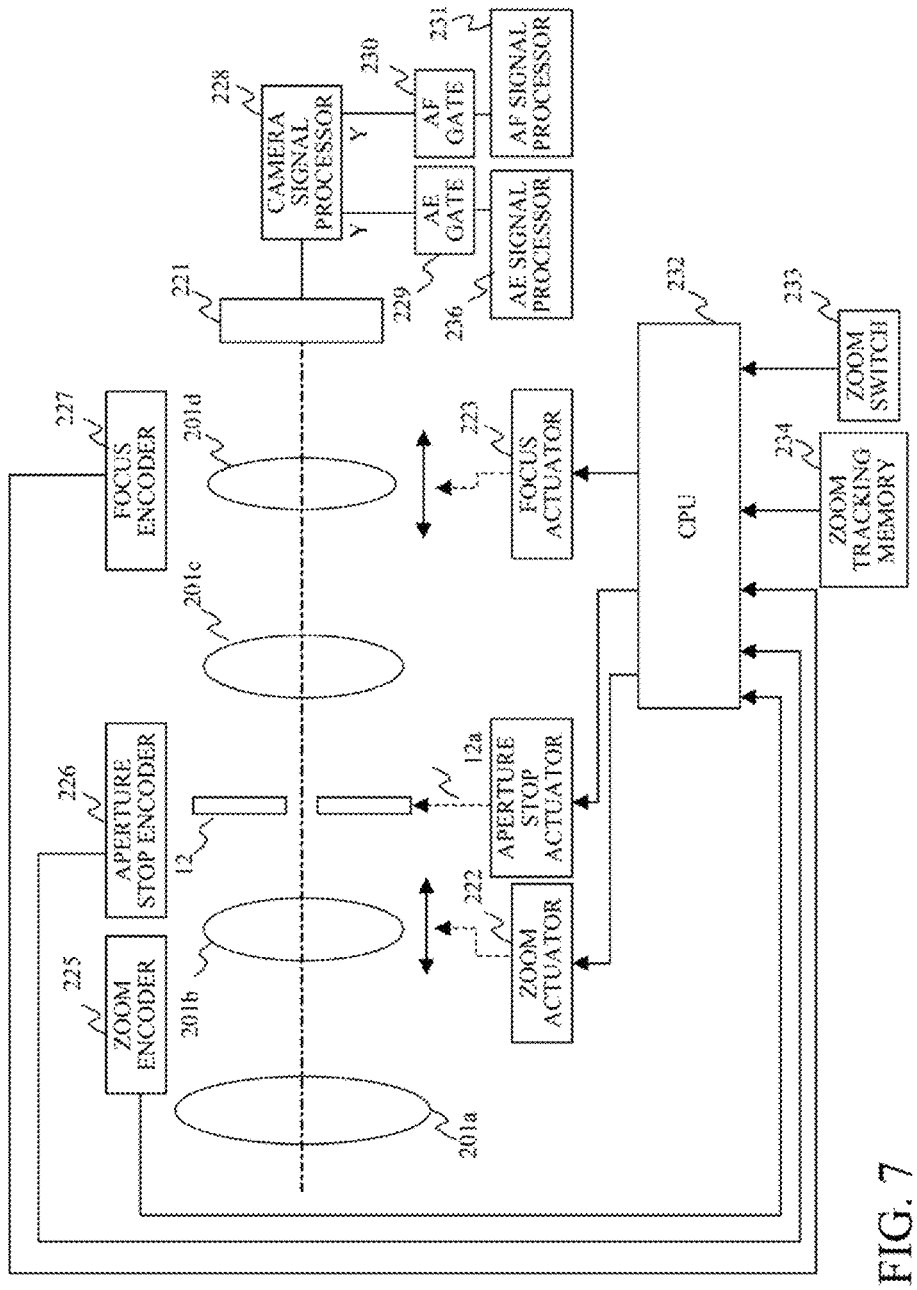
FIG. 7 is a block diagram showing a configuration of an optical apparatus that is a fourth embodiment (Embodiment 4) of the present invention and is provided with the lens driving apparatus of Embodiments 1 to 3.

FIG. 7 shows a configuration of an image pickup apparatus including a lens barrel provided with the lens driving apparatus described in any one of Embodiments 1 to 3.

Reference numeral 201a denotes a first lens unit fixed at a most-object side (frontmost) position in the lens barrel. In order from the first lens unit 201*a* toward an image plane side, reference numeral 201*b* denotes a second lens unit, 12 an aperture stop, 201*c* a third lens unit and 201*d* a fourth lens unit. These first to fourth lens units 201*a* to 201*d* and the aperture stop 12 constitute an image capturing optical system. The second lens unit 201*b* is moved in an optical axis direction of the image capturing optical system for variation of magnification, and the fourth lens unit 201*d* is moved in the optical axis direction for focusing.

Reference numeral 221 denotes an image sensor 221 that is constituted by a CCD sensor or a CMOS sensor and photoelectrically converts an object image formed by the image capturing optical system.

Reference numeral 222 denotes a zoom actuator that moves the second lens unit 201*b* in the optical axis direction, and reference numeral 223 denotes a focus actuator that moves the fourth lens unit 201*d* in the optical axis direction. This embodiment uses the lens driving apparatus described in any one of Embodiments 1 to 3 as a zoom lens driving apparatuses including the zoom actuator 222 constituted by a voice coil motor and a focus lens driving apparatus including the focus actuator 223 constituted by another voice coil motor. Although not shown, the second lens unit 201*b* and the fourth lens unit 201*d* are each held by a member corresponding to the lens holding frame 2 shown in FIGS. 1 and 2.

Reference numeral 225 denotes a zoom encoder that is constituted by a magnetic sensor (MR sensor) and provided to detect a position in the optical axis direction of the second lens unit 201*b*. Reference numeral 227 denotes a focus encoder that is constituted by another magnetic sensor (MR sensor) and provided to detect a position in the optical axis direction of the fourth lens unit 201*d*.

Reference numeral 12*a* denotes s an aperture stop actuator that opens and closes the aperture stop 12. Reference numeral 226 denotes an aperture stop encoder provided to detect a position in an open and close direction of the aperture stop 12. The aperture stop encoder 226 is constituted by, for example when the aperture stop actuator 12*a* is constituted by a stepping motor including a rotor and a stator, a hall element that detects a rotational positional relationship of the rotor and the stator.

Reference numeral 228 denotes a camera signal processor that performs various signal processes on an image capturing signal output from the image sensor 221 to produce a video signal. A luminance signal Y extracted from the video signal is input to an AE signal processor 236 and an AF signal processor 231 through an AE gate 229 and an AF gate 230, respectively.

The AF signal processor 231 extracts a high frequency component from the video signal to produce a contrast evaluation value signal corresponding to a focus state of the object image formed on the image sensor 221 (that is, a focus state of the image capturing optical system) and input it to a CPU 232 serving as a main controller. The CPU 232 performs AF (autofocus) by moving the fourth lens unit 201*d* in the optical axis direction such that the contrast evaluation value signal becomes maximum.

Reference numeral 233 denotes a zoom switch that is operated by a user, and reference numeral 234 denotes a zoom tracking memory. The zoom tracking memory 234 stores information on positions that correspond to object distances and to which the fourth lens unit 201*d* should be moved with change of the position of the second lens unit 201*b* during the variation of magnification for maintaining an in-focus state (that is, for preventing displacement of an image plane).

In the image pickup apparatus thus configured, when the second lens unit 201*b* is moved for the variation of magnification in response to a user's operation of the zoom switch 233, the CPU 232 moves the fourth lens unit 201*d* by using the position information stored in the zoom tracking memory 234. In this zoom tracking control, the CPU 232 obtains information on the position of the second lens unit 201*b* detected by using the zoom encoder 225 and information on the position of the fourth lens unit 201*d* detected by using the focus encoder 227. Moreover, the CPU 232 obtains, in the above-described AF, the information on the position of the fourth lens unit 201*d* detected by using the focus encoder 227.

This embodiment uses the lens driving apparatus described in any one of Embodiments 1 to 3 as the zoom lens driving apparatus including the zoom actuator 222 and the zoom encoder 225 and the focus lens driving apparatus including the focus actuator 223 and the focus encoder 227. This configuration enables suppression of influence of magnetic flux leakage from the zoom actuator 222 and the focus actuator 223 that are the voice coil motors on the zoom encoder 225 and the focus encoder 227 that are the MR sensors. Therefore, this embodiment enables, in the image pickup apparatus using the zoom and focus actuators 222 and 223 each constituted by the voice coil motor, highly accurate lens position detection with the zoom and focus encoders 225 and 227 each constituted by the MR sensor, and can achieve miniaturization of the image pickup apparatus.

[Embodiment 5]

Embodiments 1 to 3 described the lens driving apparatuses each moving the lens in the optical axis direction (first direction) by the voice coil motor. These lens driving apparatuses enable, as described in Embodiment 4, zooming and focusing in optical apparatuses such as the image pickup apparatus and an interchangeable lens.

In addition to Embodiment 4, as an alternative embodiment of the present invention, an optical element driving apparatus may be configured in which a voice coil motor moves an optical element such as a lens or an image sensor in a direction (first direction) orthogonal to an optical axis direction to reduce image blur caused by vibration, such as hand jiggling, of an optical apparatus such as an image pickup apparatus and an interchangeable lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-246836, filed on Nov. 10, 2011, which is hereby incorporated by reference herein in its entirety.

What is claimed is:

1. An optical element driving apparatus comprising:
an optical element movable in a first direction;
a voice coil motor comprising a magnet, a yoke and a coil and configured to move the optical element by movement of the coil with respect to the magnet and the yoke in the first direction; and
a magnetic sensor operable to detect a position of the optical element in the first direction,
wherein the yoke includes (a) a first yoke portion with a longitudinal direction thereof arranged in the first direction and having a magnet attaching surface to which the magnet is attached and (b) a second yoke portion with a longitudinal direction thereof arranged in the first direction and disposed away from the first yoke portion in a second direction orthogonal to the first direction so as to form a space with the magnet attracted to the magnet attaching surface, the space allowing movement of the coil in the first direction, wherein the second yoke portion is disposed closer to the magnetic sensor than the first yoke portion in a plane orthogonal to the first direction, and wherein, in a third direction orthogonal to the first and second directions, a magnetic path width A of the second yoke portion and a width C of the magnet have the following relationship:

$A > C.$

2. An optical element driving apparatus according to claim 1, wherein a magnetic path width B of the first yoke portion in the third direction has the following relationship with the width C of the magnet:

$B \geq C.$

3. An optical element driving apparatus according to claim 1, wherein:

a magnetic path width B of the first yoke portion in the third direction has the following relationship with the width C of the magnet:

$B > C$, and in the third direction, a center of the magnet is shifted with respect to a center of the second yoke portion to a side away from the magnetic sensor.

4. An optical element driving apparatus according to claim 1, wherein, in the third direction, the magnetic path width A of the second yoke portion, a magnetic path width B of the first yoke portion and the width C of the magnet have at least one of the following relationships:

$(A+B)/2 > C;$ $(A+B)/2 \times 0.9 > C;$ and $A \times 0.9 > C$ and $B \times 0.9 > C.$

5. An optical apparatus comprising:

a main body; and an optical element driving apparatus included in the main body, wherein the optical element driving apparatus comprises:

an optical element movable in a first direction;

a voice coil motor comprising a magnet, a yoke, and a coil, and configured to move the optical element by moving the coil with respect to the magnet and the yoke in the first direction; and a magnetic sensor operable to detect a position of the optical element in the first direction, wherein the yoke includes (a) a first yoke portion with a longitudinal direction thereof arranged in the first direction and having a magnet attaching surface to which the magnet is attached and (b) a second yoke portion with a longitudinal direction thereof arranged in the first direction and disposed away from the first yoke portion in a second direction orthogonal to the first direction so as to form a space with the magnet attracted to the magnet attaching surface, the space allowing movement of the coil in the first direction, wherein the second yoke portion is disposed closer to the magnetic sensor than the first yoke portion in a plane orthogonal to the first direction, and wherein, in a third direction orthogonal to the first and second directions, a magnetic path width A of the second yoke portion and a width C of the magnet have the following relationship:

$A > C.$

* * * * *